United States Patent
Kimura et al.

(10) Patent No.: US 12,390,862 B2
(45) Date of Patent: *Aug. 19, 2025

(54) CEMENTED CARBIDE AND CUTTING TOOL

(71) Applicant: Sumitomo Electric Industries, Ltd., Osaka (JP)

(72) Inventors: Yoshihiro Kimura, Osaka (JP); Yasuki Kido, Osaka (JP); Anongsack Paseuth, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/686,442

(22) PCT Filed: Jul. 28, 2023

(86) PCT No.: PCT/JP2023/027733
§ 371 (c)(1),
(2) Date: Feb. 26, 2024

(87) PCT Pub. No.: WO2025/027678
PCT Pub. Date: Feb. 6, 2025

(65) Prior Publication Data
US 2025/0033121 A1   Jan. 30, 2025

(51) Int. Cl.
*B23B 27/14* (2006.01)
(52) U.S. Cl.
CPC .................. *B23B 27/148* (2013.01)
(58) Field of Classification Search
CPC .......... B22F 2003/248; B22F 2005/001; B22F 2998/10; B22F 3/101; B22F 3/1017;
(Continued)

(56) References Cited

U.S. PATENT DOCUMENTS

| 5,310,605 A | 5/1994 | Baldoni et al. |
| 2008/0101977 A1* | 5/2008 | Eason ............ B22F 7/062 419/38 |

(Continued)

FOREIGN PATENT DOCUMENTS

| CN | 114507800 A | 5/2022 |
| EP | 4296390 A1 | 12/2023 |

(Continued)

OTHER PUBLICATIONS

Written Opinion mailed on Oct. 10, 2023, received for PCT Application PCT/JP2023/027733, filed on Jul. 28, 2023, 7 pages including English Translation.

(Continued)

*Primary Examiner* — Shuangyi Abu Ali
(74) *Attorney, Agent, or Firm* — XSENSUS LLP (57) ABSTRACT

A cemented carbide comprising a plurality of tungsten carbide particles and a binder phase, wherein the cemented carbide comprises at least one first element selected from the group consisting of titanium, tantalum, niobium, zirconium, cerium, yttrium, and boron, and wherein in a first graph in a coordinate system where an X axis is a distance from a position at which cobalt exhibits a maximum intensity, and a Y axis is a normalized intensity, a maximum peak M of each of the first element is present between a peak W1 of tungsten closest to an origin and a further peak W2 of tungsten closest to the peak W1, a ratio IB/IA of an intensity IB to a maximum peak intensity IA of the maximum peak M is more than 0.5 in each of the first element, and the intensity IB is an intensity of the first element at a distance P2.

10 Claims, 3 Drawing Sheets

(58) Field of Classification Search
CPC ... B22F 3/15; C22C 1/05; C22C 1/051; C22C 29/02; C22C 29/067; C22C 29/08; B23B 27/148; B23B 51/00

See application file for complete search history.

(56) References Cited

U.S. PATENT DOCUMENTS

| | | | |
|---|---|---|---|
| 2012/0040183 | A1 | 2/2012 | Kelkar |
| 2013/0105231 | A1 | 5/2013 | Oakes et al. |
| 2019/0119794 | A1 | 4/2019 | Toufar et al. |
| 2019/0233922 | A1 | 8/2019 | Kido et al. |
| 2019/0368278 | A1 | 12/2019 | Cao |
| 2022/0048213 | A1 | 2/2022 | Hamaki et al. |

FOREIGN PATENT DOCUMENTS

| | | | |
|---|---|---|---|
| JP | 2000-336451 | A | 12/2000 |
| JP | 2004230481 | A | 8/2004 |
| JP | 2005-068515 | A | 3/2005 |
| JP | 2012162753 | A | 8/2012 |
| JP | 2016-020540 | A | 2/2016 |
| JP | 2016-098393 | A | 5/2016 |
| JP | 2021085052 | A | 6/2021 |
| JP | 2021-110010 | A | 8/2021 |
| JP | 2022-109485 | A | 7/2022 |
| JP | 7311826 | B1 | 7/2023 |
| WO | 2019/116614 | A1 | 6/2019 |
| WO | 2021106276 | A1 | 6/2021 |
| WO | 2022/172729 | A1 | 8/2022 |

OTHER PUBLICATIONS

Specifications, Claims and Drawings(included Preliminary Amendment) filed on Aug. 31, 2023 in U.S. Appl. No. 18/279,634. total 40 pages.

Non-Final Rejection issued Jan. 11, 2024 in U.S. Appl. No. 18/279,634. total 18 pages.

Final Rejection issued Mar. 18, 2024 in U.S. Appl. No. 18/279,634. total 17 pages.

Advisory Action issued Apr. 30, 2024 in U.S. Appl. No. 18/279,634. total 7 pages.

Non-Final Rejection issued Jul. 16, 2024 in U.S. Appl. No. 18/279,634. total 42 pages.

Final Rejection issued Oct. 1, 2024 in U.S. Appl. No. 18/279,634. total 44 pages.

Advisory Action issued Nov. 22, 2024 in U.S. Appl. No. 18/279,634. total 4 pages.

Z. Roulon et al., "Interface characteristics in cemented carbides with alternative binders", Jun. 7, 2020, International Journal of Refractory Metals & Hard Materials, vol. 92, 105306(8 pages). (Year:2020).

Written Opinion mailed on Apr. 18, 2023, received for PCT Application PCT/JP2023/003933, filed on Feb. 7, 2023, 7 pages including English Translation.

Advisory Action issued Nov. 22, 2024 in the related U.S. Appl. No. 18/279,634. total 4 pages.

Office Action issued Apr. 1, 2025 in related U.S. Appl. No. 18/279,634.

* cited by examiner

CEMENTED CARBIDE AND CUTTING TOOL

CROSS-REFERENCE TO RELATED APPLICATION

This application is based on PCT filing PCT/JP2023/027733, filed Jul. 28, 2023, the entire content of which is incorporated herein by reference.

TECHNICAL FIELD

The present disclosure relates to a cemented carbide and a cutting tool.

BACKGROUND ART

Conventionally, a cemented carbide including a tungsten carbide (WC) particle and a binder phase including cobalt as a main component has been used as a material for a cutting tool (PTL 1 and PTL 2).

CITATION LIST

Patent Literature

PTL 1: Japanese Patent Laying-Open No. 2016-098393
PTL 2: Japanese Patent Laying-Open No. 2021-110010

SUMMARY OF INVENTION

The cemented carbide of the present disclosure is a cemented carbide comprising a plurality of tungsten carbide particles and a binder phase, wherein
  the cemented carbide comprises a total of 80% by volume or more of the tungsten carbide particles and the binder phase,
  the cemented carbide comprises 0.1% by volume or more and 20% by volume or less of the binder phase,
  the cemented carbide comprises at least one first element selected from the group consisting of titanium, tantalum, niobium, zirconium, cerium, yttrium, and boron,
  the cemented carbide comprises a total of 0.01 atomic % or more and 20 atomic % or less of the first element, and
  the binder phase comprises 50% by mass or more of cobalt, and wherein
  in a first graph showing results obtained by carrying out line analysis by using an energy dispersive X-ray spectrometer attached to a transmission electron microscope along a first direction going from the binder phase to the tungsten carbide particles adjacent to each other, in a coordinate system where an X axis is a distance from a position at which cobalt exhibits a maximum intensity, and a Y axis is a normalized intensity,
  a maximum peak M of each of the first element is present between a peak W1 of tungsten closest to an origin and a further peak W2 of tungsten closest to the peak W1,
  in each of the first element, a ratio IB/IA of an intensity IB to a maximum peak intensity IA of the maximum peak M is more than 0.5, and
  the intensity IB is an intensity of the first element at a distance P2, which is a distance of 0.2 nm from a distance P1 at the maximum peak intensity IA toward an opposite side of the origin.

DETAILED DESCRIPTION

Problem to be Solved by the Present Disclosure

In recent years, from the viewpoint of cost reduction, there has been a demand for improvement in tool life in various types of cutting work. A cutting tool used for cutting work of a high-hardness material has also been required to have an improved tool life.

Therefore, an object of the present disclosure is to provide a cemented carbide that can provide a cutting tool that has a long tool life, particularly even in cutting work of a high-hardness material, when used as a tool material, and a cutting tool having a long tool life.

Advantageous Effect of the Present Disclosure

According to the present disclosure, it is possible to provide a cemented carbide that can provide a cutting tool that has a long tool life, particularly even in cutting work of a high-hardness material, when used as a cutting tool material, and a cutting tool having a long tool life.

DESCRIPTION OF EMBODIMENTS

First, aspects of the present disclosure will be listed and described.

(1) The cemented carbide of the present disclosure is a cemented carbide comprising a plurality of tungsten carbide particles and a binder phase, wherein
  the cemented carbide comprises a total of 80% by volume or more of the tungsten carbide particles and the binder phase,
  the cemented carbide comprises 0.1% by volume or more and 20% by volume or less of the binder phase,
  the cemented carbide comprises at least one first element selected from the group consisting of titanium, tantalum, niobium, zirconium, cerium, yttrium, and boron,
  the cemented carbide comprises a total of 0.01 atomic % or more and 20 atomic % or less of the first element, and
  the binder phase comprises 50% by mass or more of cobalt, and wherein
  in a first graph showing results obtained by carrying out line analysis by using an energy dispersive X-ray spectrometer attached to a transmission electron microscope along a first direction going from the binder phase to the tungsten carbide particles adjacent to each other, in a coordinate system where an X axis is a distance from a position at which cobalt exhibits a maximum intensity, and a Y axis is a normalized intensity,
  a maximum peak M of each of the first element is present between a peak W1 of tungsten closest to an origin and a further peak W2 of tungsten closest to the peak W1,
  in each of the first element, a ratio IB/IA of an intensity IB to a maximum peak intensity IA of the maximum peak M is more than 0.5, and the intensity IB is an intensity of the first element at a distance P2, which is a distance of 0.2 nm from a distance P1 at the maximum peak intensity IA toward an opposite side of the origin.

According to the present disclosure, it is possible to provide a cemented carbide that can provide a cutting tool that has a long tool life, particularly even in cutting work of a high-hardness material, when used as a cutting tool material, and a cutting tool having a long tool life.

(2) In (1) above, the cemented carbide may include 18% by volume or less of the binder phase. According to this, the tool life is further improved.

(3) The cutting tool according to the present disclosure is a cutting tool comprising a cutting edge formed from the cemented carbide according to any of (1) or (2) above.

The cutting tool according to the present disclosure can have a long tool life.

Details of the Embodiments of the Present Disclosure

With reference to the drawings, specific examples of the cemented carbide and the cutting tool according to the present disclosure will be described below. In the drawings of the present disclosure, the same reference signs represent the same portions or equivalent portions. In addition, a dimensional relationship such as length, width, thickness, or depth is appropriately changed for clarity and simplification of the drawings, and does not necessarily represent an actual dimensional relationship.

As used in the present disclosure, the expression of a range in the format "A to B" means the upper limit and the lower limit of the range (that is, A or more and B or less), and when no unit is written in A and a unit is only written in B, the unit for A and the unit for B are the same.

As used in the present disclosure, when a compound or the like is represented by a chemical formula, if the atomic ratio is not particularly limited, the chemical formula shall include all conventionally known atomic ratios, and should not necessarily be limited only to those within the stoichiometric range.

As used in the present disclosure, when one or more numerical values are written as each of the lower limit and the upper limit of a numerical range, a combination of any one numerical value written as the lower limit and any one numerical value written as the upper limit shall also be disclosed. For example, when a1 or more, b1 or more, and c1 or more are written as the lower limit, and a2 or less, b2 or less, and c2 or less are written as the upper limit, a1 or more and a2 or less, a1 or more and b2 or less, a1 or more and c2 or less, b1 or more and a2 or less, b1 or more and b2 or less, b1 or more and c2 or less, c1 or more and a2 or less, c1 or more and b2 or less, and c1 or more and c2 or less shall be disclosed.

Embodiment 1: Cemented Carbide

The cemented carbide according to one embodiment of the present disclosure (hereinafter also referred to as "Embodiment 1") is a cemented carbide comprising a plurality of tungsten carbide particles and a binder phase, wherein the cemented carbide comprises a total of 80% by volume or more of the tungsten carbide particles and the binder phase, the cemented carbide comprises 0.1% by volume or more and 20% by volume or less of the binder phase, the cemented carbide comprises at least one first element selected from the group consisting of titanium, tantalum, niobium, zirconium, cerium, yttrium, and boron, the cemented carbide comprises a total of 0.01 atomic % or more and 20 atomic % or less of the first element, and the binder phase comprises 50% by mass or more of cobalt, and wherein in a first graph showing results obtained by carrying out line analysis by using an energy dispersive X-ray spectrometer attached to a transmission electron microscope along a first direction going from the binder phase to the tungsten carbide particles adjacent to each other, in a coordinate system where an X axis is a distance from a position at which cobalt exhibits a maximum intensity, and a Y axis is a normalized intensity, a maximum peak M of each of the first element is present between a peak W1 of tungsten closest to an origin and a further peak W2 of tungsten closest to the peak W1, in each of the first element, a ratio IB/IA of an intensity IB to a maximum peak intensity IA of the maximum peak M is more than 0.5, and the intensity IB is an intensity of the first element at a distance P2, which is a distance of 0.2 nm from a distance P1 at the maximum peak intensity IA toward an opposite side of the origin.

The cemented carbide of Embodiment 1 can provide a cemented carbide that can provide a cutting tool that has a long tool life, particularly even in cutting work of a high-hardness material, when used as a tool material, and a cutting tool having a long tool life. Although the reason for this is not clear, it is presumed as follows.

The cemented carbide of Embodiment 1 includes a plurality of tungsten carbide particles (hereinafter also referred to as "WC particles") and a binder phase, and the total content of the WC particles and binder phase in the cemented carbide is 80% by volume or more. According to this, the cemented carbide has high hardness and strength, and a cutting tool using the cemented carbide can have excellent wear resistance and breakage resistance.

The cemented carbide of Embodiment 1 includes 0.1% by volume or more and 20% by volume or less of the binder phase, and the binder phase includes 50% by mass or more of cobalt. According to this, the cemented carbide has high hardness and strength, and a cutting tool using the cemented carbide can have excellent wear resistance and breakage resistance.

The cemented carbide of Embodiment 1 includes a total of 0.01 atomic % or more and 20 atomic % or less of at least one first element selected from the group consisting of titanium, tantalum, niobium, zirconium, cerium, yttrium, and boron. In a first graph obtained by carrying out line analysis on the cemented carbide of Embodiment 1, the maximum peak M of each of the first element is present between a peak W1 of tungsten closest to the origin and a further peak W2 of tungsten closest to the peak W1. This indicates that the maximum concentration region of the first element is present in the surface layer portion of the tungsten carbide particles. Furthermore, the ratio IB/IA of the intensity IB to the maximum peak intensity IA is more than 0.5. This indicates that the first element has penetrated deep into the tungsten carbide particles.

In the cemented carbide of Embodiment 1, it is presumed that because the first element has penetrated deep into the tungsten carbide particles, the presence of the first element affects a physical property of the tungsten carbide particles, increasing the hardness of the tungsten carbide particles. Because of this, the cemented carbide of Embodiment 1 has improved wear resistance, and when the cemented carbide of Embodiment 1 is used as a material for a cutting tool, the occurrence of damage due to wear during cutting is suppressed.

<Composition of Cemented Carbide>

Figure 1:
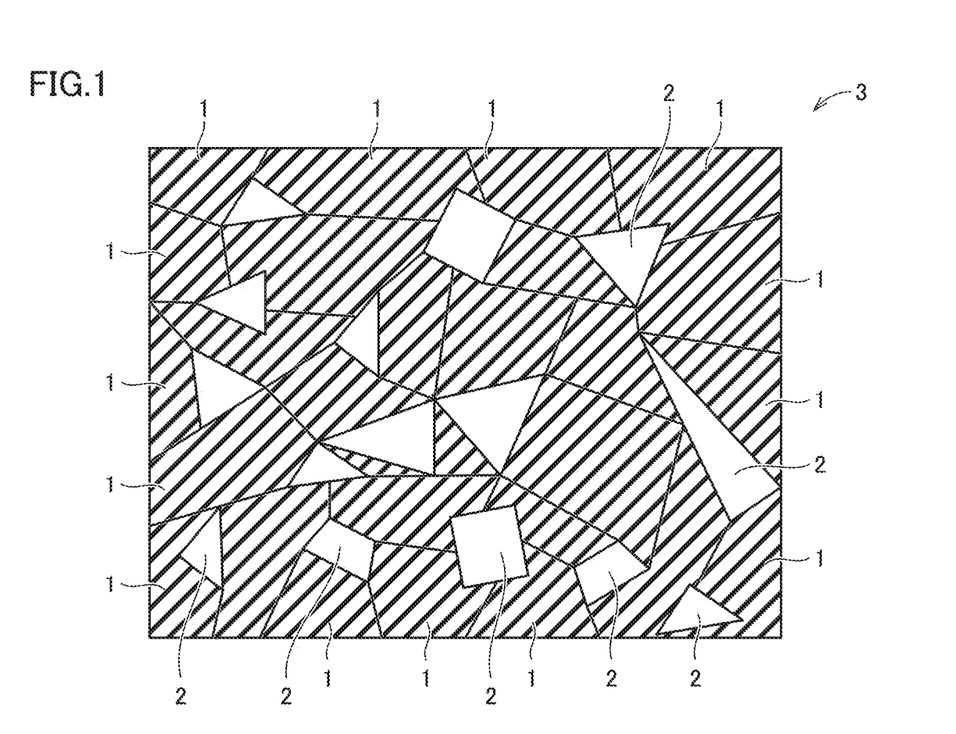
FIG. 1 is a schematic cross-sectional view of a cemented carbide according to Embodiment 1.

As shown in FIG. 1, a cemented carbide 3 of Embodiment 1 includes a plurality of tungsten carbide particles 1 (hereinafter also referred to as "WC particles") and a binder phase 2, wherein the total content of the WC particles and the binder phase in cemented carbide 3 is 80% by volume or more. The lower limit of the total content of the WC particles and the binder phase in the cemented carbide may be 82% by volume or more, 84% by volume or more, 85% by volume or more, or 86% by volume or more. The upper limit of the total content of the WC particles and the binder phase in the cemented carbide may be 100% by volume or less. The upper limit of the total content of the WC particles and the binder phase in the cemented carbide may be 99% by volume or less, or 98% by volume or less, from the viewpoint of manufacturing. The total content of the WC particles and the binder phase in the cemented carbide may be 80% by volume or more and 100% by volume or less, 82% by volume or more and 100% by volume or less, or 84% by volume or more and 100% by volume or less.

The cemented carbide of Embodiment 1 can consist of a plurality of tungsten carbide particles and a binder phase. The cemented carbide of the present embodiment can include a different phase in addition to the tungsten carbide particles and the binder phase. Examples of the different phase include a phase consisting of at least one selected from the group consisting of TiCN, TiC, $TiO_2$, TaC, $Ta_2O_5$, ZrC, $ZrO_2$, $CeC_2$, $CeO_2$, YC, $Y_2O_3$, $B_4C$, and $B_2O_3$.

The cemented carbide of Embodiment 1 can consist of the tungsten carbide particles, the binder phase, and a different phase. Any content of the different phase in the cemented carbide is allowed as long as it does not impair the effect of the present disclosure. For example, the content of the different phase in the cemented carbide may be 0% by volume or more and 20% by volume or less, 0% by volume or more and 18% by volume or less, or 0% by volume or more and 16% by volume or less. In this case, the total content of the WC particles and the binder phase in the cemented carbide may be 80% by volume or more and less than 100% by volume, 82% by volume or more and less than 100% by volume, or 84% by volume or more and less than 100% by volume.

The cemented carbide of Embodiment 1 can include an impurity. Examples of the impurity include manganese (Mn), magnesium (Mg), calcium (Ca) and sulfur(S). Any content of the impurity in the cemented carbide is allowed as long as it does not impair the effect of the present disclosure. For example, the content of the impurity in the cemented carbide is preferably 0% by mass or more and less than 0.1% by mass. The content of the impurity in the cemented carbide is measured by ICP emission spectroscopy (Inductively Coupled Plasma Emission Spectroscopy (measuring apparatus: "ICPS-8100" (trademark) of Shimadzu Corporation)).

The lower limit of the content of the tungsten carbide particles in the cemented carbide of Embodiment 1 may be 60% by volume or more, 65% by volume or more, 66% by volume or more, or 68% by volume or more. The upper limit of the content of the tungsten carbide particles in the cemented carbide may be 99.9% by volume or less, 99.8% by volume or less, 99% by volume or less, 98% by volume or less, 96% by volume or less, or 94% by volume or less. The content of the tungsten carbide particles in the cemented carbide may be 60% by volume or more and 99.9% by volume or less, 65% by volume or more and 99.8% by volume or less, 66% by volume or more and 99% by volume or less, or 68% by volume or more and 98% by volume or less.

The cemented carbide of Embodiment 1 includes 0.1% by volume or more and 20% by volume or less of the binder phase. From the viewpoint of improving toughness, the lower limit of the content of the binder phase in the cemented carbide is 0.1% by volume or more, and may be 1% by volume or more, 2% by volume or more, 3% by volume or more, 5% by volume or more, or 8% by volume or more. From the viewpoint of improving hardness, the upper limit of the content of the binder phase in the cemented carbide is 20% by volume or less, and may be 19% by volume or less, 18% by volume or less, 17% by volume or less, 16% by volume or less, or 15% by volume or less. The content of the binder phase in the cemented carbide may be 0.1% by volume or more and 18% by volume or less, 1% by volume or more and 18% by volume or less, 3% by volume or more and 17% by volume or less, 5% by volume or more and 16% by volume or less, or 8% by volume or more and 15% by volume or less. When the content of the binder phase in the cemented carbide is 18% by volume or less, the hardness of the cemented carbide is further improved, and the wear resistance is further improved, and thus the tool life of a cutting tool using the cemented carbide as a material is further improved.

The method for measuring the content (% by volume) of the tungsten carbide particles in the cemented carbide and the content (% by volume) of the binder phase in the cemented carbide is as follows.

(A1) The cemented carbide is cut out at an arbitrary position to expose a cross section. The cross section is mirror-finished with a cross-section polisher (manufactured by JEOL Ltd.).

(B1) The mirror-finished surface of the cemented carbide is analyzed by using a scanning electron microscope-energy dispersive X-ray spectroscopy (SEM-EDX) (apparatus: Gemini 450 (trademark) manufactured by Carl Zeiss AG) to identify an element included in the cemented carbide.

(C1) The mirror-finished surface of the cemented carbide is photographed with a scanning electron microscope (SEM) to obtain a backscattered electron image. The photographing region of the photographed image is set to the central part of the cross section of the cemented carbide, that is, a position that does not include a portion that clearly differs in a property from a bulk portion, such as the vicinity of the surface of the cemented carbide, (a position where the entire photographing region is the bulk portion of the cemented carbide). The observation magnification is 5000 times. The measurement conditions are an acceleration voltage of 3 kV, a current value of 2 nA, and a working distance (WD) of 5 mm.

(D1) The photographing region of (C1) above is analyzed by using an energy dispersive X-ray analyzer attached to the SEM (SEM-EDX) to identify the distribution of the element identified in (B1) above in the photographing region and obtain an elemental mapping image.

(E1) The backscattered electron image obtained in (C1) above is taken into a computer and subjected to binarization processing by using image analysis software (OpenCV, SciPy). On the image after binarization processing, the tungsten carbide particles are shown in white and the binder phase is shown in gray to black. The binarization threshold varies depending on the contrast, and thus is set for each image.

(F1) The elemental mapping image obtained in (D1) above and the image after binarization processing obtained in (E1) above are superimposed to identify regions in which the tungsten carbide particles and the binder phase, respectively, are present in the image after binarization processing. Specifically, the region which is shown in white in the image after binarization processing and in which tungsten (W) and carbon (C) are present in the elemental mapping image corresponds to the region in which the tungsten carbide particles are present. The region which is shown in gray to black in the image after binarization processing and in which cobalt (Co) is present in the elemental mapping image corresponds to the region in which the binder phase is present.

(G1) One rectangular measurement field of view of 24.9 µm×18.8 µm is set in the image after binarization processing. By using the image analysis software, the area percentage of each of the tungsten carbide particles and the binder phase is measured with the area of the entire measurement field of view as the denominator.

(H1) The measurement of (G1) above is carried out in 5 different measurement fields of view that do not overlap each other. Herein, the average of the area percentages of the tungsten carbide particles in the 5 measurement fields of view corresponds to the content (% by volume) of the tungsten carbide particles in the cemented carbide, and the average of the area percentages of the binder phase in the 5 measurement fields of view corresponds to the content (% by volume) of the binder phase in the cemented carbide.

When the cemented carbide includes a different phase in addition to the WC particles and the binder phase, the content of the different phase in the cemented carbide can be obtained by subtracting the content (% by volume) of the tungsten carbide particles and the content (% by volume) of the binder phase measured by the above procedure from the entire cemented carbide (100% by volume).

As long as the applicant has carried out the measurement, it has been confirmed that as long as the measurement is carried out on the same sample, even if the cut-out location of the cross section of the cemented carbide, the photographing region described in (C1) above, and the measurement field of view described in (G1) above are arbitrarily set to measure the content of the tungsten carbide particles and the content of the binder phase in the cemented carbide a plurality of times according to the above procedure, there is little variation in the measurement results, and that even if the cut-out location of the cross section of the cemented carbide, the photographing region, and the measurement field of view are arbitrarily set, it will not be contrived.

<Tungsten Carbide Particles>

In Embodiment 1, the tungsten carbide particles include tungsten carbide and the first element. In the present disclosure, the inclusion of the first element in the tungsten carbide particles is indicated by confirming that in a first graph obtained by carrying out line analysis on the cemented carbide, the maximum peak M of each of the first element is present between a peak W1 of tungsten closest to the origin and a further peak W2 of tungsten closest to the peak W1.

The tungsten carbide particles can include an impurity element other than carbon, tungsten, and the first element as long as the effect of the present disclosure is not impaired. The content of an impurity in the tungsten carbide particles (when two or more elements constitute the impurity, the total concentration of the elements) is less than 0.1% by mass. The content of the impurity element in the tungsten carbide particles is measured by ICP emission spectrometry.

In Embodiment 1, the average particle diameter of the tungsten carbide particles is not particularly limited. The average particle diameter of the tungsten carbide particles can be, for example, 0.1 µm or more and 3.5 µm or less. It has been confirmed that the cemented carbide of Embodiment 1 can have a long tool life regardless of the average particle diameter of the tungsten carbide particles.

<Binder Phase>

In Embodiment 1, the binder phase includes 50% by mass or more of cobalt. This can impart excellent toughness to the cemented carbide. The lower limit of the cobalt content of the binder phase may be 55% by mass or more, 60% by mass or more, or 65% by mass or more. The upper limit of the cobalt content of the binder phase may be 100% by mass or less, less than 100% by mass, 99% by mass or less, 98% by mass or less, 95% by mass or less, or 90% by mass or less. The cobalt content of the binder phase may be 50% by mass or more and less than 100% by mass, 60% by mass or more and 99% by mass or less, 65% by mass or more and 98% by mass or less, 65% by mass or more and 95% by mass or less, or 65% by mass or more and 90% by mass or less.

The method for measuring the content of cobalt in the binder phase is as follows. In the same manner as in (A1) to (F1) of the method for measuring the content of the tungsten carbide particles, and the content of the binder phase in the cemented carbide, the region in which the binder phase is present is identified on an image after binarization processing. The region in which the binder phase is present is analyzed by using SEM-EDX to measure the cobalt content of the binder phase.

As long as the applicant has carried out the measurement, it has been confirmed that as long as the measurement is carried out on the same sample, even if the cut-out location of the cross section of the cemented carbide and the photographing region described in (C1) above are arbitrarily set to measure the content of cobalt in the binder phase a plurality of times according to the above procedure, there is little variation in the measurement results, and that even if the cut-out location of the cross section of the cemented carbide and the photographing region are arbitrarily set, it will not be contrived.

In Embodiment 1, the binder phase can include, in addition to cobalt, at least one second element selected from the group consisting of boron (B), aluminum (Al), silicon (Si), iron (Fe), nickel (Ni), germanium (Ge), ruthenium (Ru), rhenium (Re), osmium (Os), iridium (Ir), platinum (Pt), tantalum (Ta), and niobium (Nb). The binder phase can consist of cobalt, the second element, and an unavoidable impurity. Examples of the unavoidable impurity include manganese (Mn), magnesium (Mg), calcium (Ca), and sulfur(S). The content of the unavoidable impurity in the binder phase is less than 0.1% by mass. The content of the impurity element in the binder phase is measured by ICP emission spectrometry.

<First Element>

The cemented carbide of Embodiment 1 includes at least one first element selected from the group consisting of titanium, tantalum, niobium, zirconium, cerium, yttrium, and boron. The total content of the first element in the cemented carbide is 0.01 atomic % or more and 20 atomic % or less. Here, the total content of the first element means, when the cemented carbide includes one first element, the content of the one first element, and, when the cemented carbide includes two or more first elements, the total content of all the first elements included in the cemented carbide.

The lower limit of the total content of the first element in the cemented carbide is 0.01 atomic % or more, and may be 0.07 atomic % or more, 0.09 atomic % or more, 0.10 atomic % or more, 0.50 atomic % or more, 1.0 atomic % or more, 3.0 atomic % or more, 5.0 atomic % or more, or 7.0 atomic % or more, from the viewpoint of improving hardness. The upper limit of the content of the first element in the cemented carbide is 20.0 atomic % or less, and may be 17.0 atomic % or less, 15.0 atomic % or less, 14.0 atomic % or less, or 10.0 atomic % or less, from the viewpoint of suppressing a decrease in the basic physical properties of the cemented carbide. The total content of the first element in the cemented carbide may be 0.07 atomic % or more and 17.0 atomic % or less, 0.09 atomic % or more and 15.0 atomic % or less, 0.10 atomic % or more and 15.0 atomic % or less, 0.50 atomic % or more and 15.0 atomic % or less, 1.0 atomic % or more and 14.0 atomic % or less, 3.0 atomic % or more and 14.0 atomic % or less, 5.0 atomic % or more and 10.0 atomic % or less, or 7.0 atomic % or more and 10.0 atomic % or less.

The type of the first element included in the cemented carbide and the content of the first element included in the cemented carbide are determined by ICP emission spectrometry.

<Line Analysis>

Figure 2:
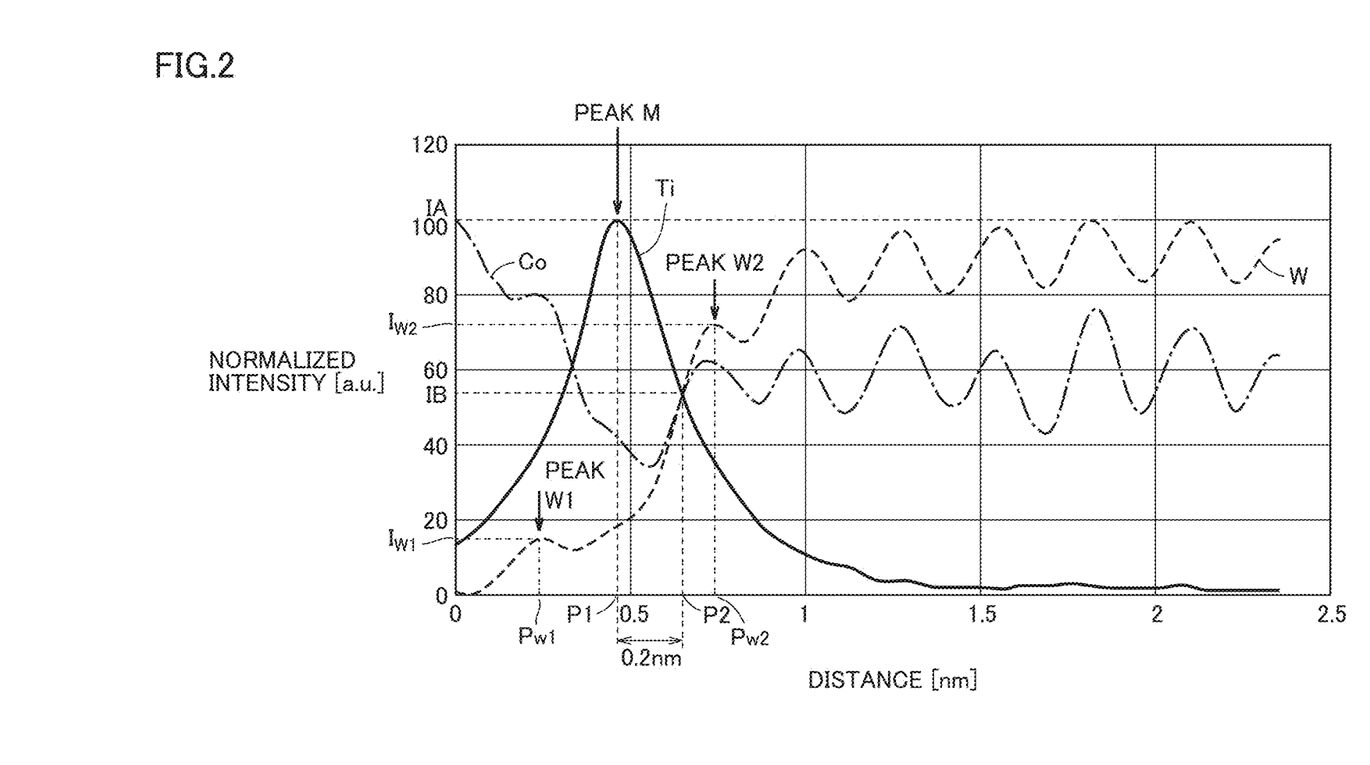
FIG. 2 is a diagram showing an example of the first graph for the cemented carbide according to Embodiment 1.

Results obtained by carrying out line analysis on the cemented carbide of Embodiment 1 by using an energy dispersive X-ray spectrometer attached to a transmission electron microscope along a first direction going from the binder phase to the tungsten carbide particles adjacent to each other will be described with reference to FIG. 2. FIG. 2 is an example of a first graph showing results obtained by carrying out line analysis on the cemented carbide of Embodiment 1 for tungsten, cobalt, and the first element (titanium in FIG. 2), which are elements included in the cemented carbide, in a coordinate system where the X axis is the distance [nm] from a position at which cobalt exhibits the maximum intensity, and the Y axis is the normalized intensity (normalized intensity) [a.u.]. In the cemented carbide shown in the first graph of FIG. 2, the binder phase is cobalt. In the first graph, the origin O has a distance of 0 nm on the X axis, and corresponds to the position at which cobalt exhibits the maximum intensity in the line analysis results. The normalized intensity refers to the relative intensity of each element when the largest intensity within a region in which line analysis is carried out is 100.

As shown in FIG. 2, the maximum peak M of the first element is present between a peak W1 of tungsten closest to the origin O of the first graph and a further peak W2 of tungsten closest to the peak W1. The further peak W2 is present at a position further away from the origin O than the peak W1. That is, a distance $P_{w1}$ at the maximum peak intensity $I_{w1}$ of the peak W1, a distance $P_{w2}$ at the maximum peak intensity $I_{w2}$ of the peak W2, and a distance P1 at the maximum peak intensity IA of the maximum peak M shows the relationship $P_{w1}<P1<P_{w2}$. In the present disclosure, the peak intensity of a peak of each element in the first graph means the normalized intensity of the peak of the element.

The ratio IB/IA of the intensity IB to the maximum peak intensity IA of the maximum peak M is more than 0.5. The intensity IB is the intensity of the first element at a distance P2, which is a distance of 0.2 nm from a distance P1 at the maximum peak intensity toward the opposite side of the origin. In FIG. 2, the first element is one element (titanium), and thus there is one peak M. When the first element includes two or more elements, the number of maximum peaks of the first element that are present is the same as the number of the types of the elements, all the peaks are present between the peaks W1 and W2, and the ratio IB/IA at each peak is more than 0.5.

The lower limit of the ratio IB/IA is more than 0.5, and may be 0.51 or more, 0.54 or more, 0.55 or more, 0.59 or more, 0.60 or more, 0.65 or more, or 0.70 or more. The upper limit of the ratio IB/IA may be 0.95 or less, 0.92 or less, 0.90 or less, 0.87 or less, 0.85 or less, or 0.80 or less. The ratio IB/IA may be 0.51 or more and 0.95 or less, 0.54 or more and 0.92 or less, 0.55 or more and 0.90 or less, 0.59 or more and 0.87 or less, 0.60 or more and 0.85 or less, 0.65 or more and 0.80 or less, or 0.70 or more and 0.80 or less.

In the present disclosure, line analysis of the cemented carbide and acquisition of the first graph based on the analysis results are carried out by the following procedure. The cemented carbide is sliced into a thickness of 30 to 100 nm by using an argon ion slicer ("Cryo Ion Slicer IB-09060BCIS" (trademark) manufactured by JEOL Ltd.) under conditions of an acceleration voltage of 6 kV and a finish acceleration voltage of 2 kV to make a sample for measurement. Next, the sample for measurement is observed at a magnification of 200000 times by using a TEM (Transmission Electron Microscopy) ("JEM-ARM300F2" (trademark) manufactured by JEOL Ltd.) under a condition of an acceleration voltage of 200 V to obtain a first image (not shown).

On the first image, the tungsten carbide particles are observed as white regions, the binder phase is observed as a black region. On the first image, the interface between the tungsten carbide particles and the binder phase is arbitrarily selected.

Next, the selected interface is positioned such that it passes through the vicinity of the center of the image, the observation magnification is adjusted such that the field of view size is 10 nm×10 nm, and observation is carried out to obtain a second image (not shown). On the second image, the extension direction in which the interface extends is confirmed. Line analysis is carried out by using an energy dispersive X-ray spectrometer attached to a transmission electron microscope (TEM-EDX) along a direction perpendicular to the extension direction and a first direction going from position X1 provided in a binder phase to position X2 provided in tungsten carbide particles adjacent to the binder phase to measure the distributions of tungsten, cobalt, and the first element. Here, the term direction perpendicular to the extension direction of the interface means the direction along a straight line that intersects the tangent to the extension direction at an angle of 90°±5°. The position X1 in a binder phase is set to a position at which the distance from a distance P1 of the peak M toward the origin side is 0.5 nm or more and 5 nm or less and at which a peak of cobalt can be confirmed in the first graph. The position X2 in tungsten carbide particles is set to a position at which the distance from the distance P1 of the peak M toward the opposite side of the origin is 2 nm or more and 5 nm or less in the first graph. The conditions for carrying out EDX are an acceleration voltage of 200 kV, a camera length of 10 cm, a pixel count of 128×128 pixels, and a dwell time of 0.02 to 3 s/pixel.

The measurement results of each of tungsten, cobalt, and the first element are shown in a coordinate system where the X axis is the distance from a position at which cobalt exhibits the maximum intensity and the Y axis is the normalized intensity, to obtain a first graph.

For the cemented carbide, first images of five fields of view that do not overlap with each other are arbitrarily acquired, and the above analysis is carried out based on each of the first images to obtain five first graphs. When "the maximum peak M of each of the first element is present between the peak W1 and the peak W2, and the ratio IB/IA is more than 0.5" in four or more of the first graphs, it is determined that "the maximum peak M of each of the first element is present between the peak W1 and the peak W2, and the ratio IB/IA is more than 0.5" in the first graph for the cemented carbide. In order to obtain this criterion, the present inventors carried out a plurality of line analyses on each of a plurality of cemented carbides. As a result, the present inventors confirmed that among these cemented carbides, a cemented carbide in which it is shown in 80% or more of the first graphs that "the maximum peak M of each of the first element is present between the peak W1 and the peak W2, and the ratio IB/IA is more than 0.5" exhibits the effect of the present disclosure. In consideration of the method for manufacturing the cemented carbide, it is presumed that the existence forms of tungsten and the first element in an interface region between WC particles and a binder phase are almost the same within the same cemented carbide.

<Method for Manufacturing Cemented Carbide>

The cemented carbide of the present embodiment can be manufactured by carrying out a raw material powder preparing step, a mixing step, a compacting step, a sintering step, a cooling step, and an HIP step in presented order. Hereinafter, each step will be described.

<Preparing Step>

The preparing step is a step for preparing raw material powders of materials that constitute a cemented carbide material. Examples of the raw material powders include a tungsten carbide powder (hereinafter also referred to as a "WC powder"), a cobalt (Co) powder, and a first element containing powder. Examples of the first element containing powder include a TiCN powder, a TaC powder, a NbC powder, a ZrC powder, a CeC$_2$ powder, a Y$_2$O$_3$ powder, and a B$_4$C powder. In addition to these raw material powders, a nickel (Ni) powder, or the like can be prepared. As these raw material powders, commercially available ones can be used. The average particle diameter of these raw material powders is not particularly limited, and can be, for example, 0.1 to 3.0 µm. The term average particle diameter of a raw material powder means the average particle diameter measured by the FSSS (Fisher Sub-Sieve Sizer) method. The average particle diameter is measured by using "Sub-Sieve Sizer Model 95" (trademark) manufactured by Fisher Scientific.

<Mixing Step>

The mixing step is mixing raw material powders prepared in the preparing step at predetermined proportions. A mixed powder in which raw material powders are mixed is obtained by the mixing step. The mixing proportions of raw material powders are appropriately adjusted according to the intended composition of the cemented carbide.

The mixing of raw material powders can be carried out by using a ball mill. The mixing conditions can be, for example, a medium diameter of 6 mm, a rotation speed of 200 rpm, and a mixing time of 20 hours.

After the mixing step, the mixed powder may be granulated as needed. By granulating the mixed powder, it is easy to fill a die or a mold with the mixed powder during the compacting step described later. A known granulation method can be applied to the granulation, and for example, a commercially available granulator such as a spray dryer can be used.

<Compacting Step>

The compacting step is a step for compacting the mixed powder obtained in the mixing step into a shape for a cutting tool to obtain a compact. As the compacting method and the compacting conditions in the compacting step, a general method and general conditions may be adopted, and these are not particularly limited.

<Sintering Step>

In the sintering step, the compact obtained in the compacting step is sintered to obtain a cemented carbide. In the method for manufacturing the cemented carbide according to the present disclosure, first, the compact is held in Ar gas at a pressure of 5 MPa and a temperature of 1450° C. for 400 minutes (hereinafter also referred to as the "first sintering step"), and then held in Ar gas at a pressure of 5 MPa and a temperature of 1350° C. for 300 minutes (hereinafter also referred to as the "second sintering step") and thereby sintered to obtain a cemented carbide intermediate.

<Cooling Step>

The cooling step is a step of cooling the cemented carbide intermediate after the sintering step. For example, the cemented carbide intermediate can be rapidly cooled in Ar gas under a condition of a pressure of 100 to 400 MPaG.

<HIP Step>

A pressure of 100 MPa is loaded to the cooled cemented carbide intermediate for 120 minutes by using a hot isostatic pressing (HIP) apparatus. Thereby, a cemented carbide can be obtained.

<Characteristics of Method for Manufacturing Cemented Carbide According to the Present Embodiment>

In the present embodiment, the mixing step is carried out for 20 hours by using a ball mill at a rotation speed of 200 rpm, the sintering step is carried out in two stages: first, holding at a pressure of 5 MPa and a temperature of 1450° C. for 400 minutes (first sintering step) and then holding at a pressure of 5 MPa and a temperature of 1350° C. for 300 minutes (second sintering step), and HIP treatment is carried out at 100 MPa for 120 minutes. Thereby, it is presumed that the first graph for the obtained cemented carbide shows that "the maximum peak M of each of the first element is present between the peak W1 and the peak W2, and the ratio IB/IA is more than 0.5." It has been newly found as a result of extensive studies by the present inventors that the cemented carbide of the present disclosure can be realized by such mixing conditions and sintering conditions. The mixing conditions and the sintering conditions used in the present embodiment reduce production efficiency and thus have not been adopted by those skilled in the art.

In a conventional general method for manufacturing a cemented carbide, the rotation speed is 100 rpm, and the mixing time is about 10 hours, and the sintering step is carried out in one stage, in which the temperature is raised to a predetermined temperature and then maintained for a predetermined time. In the cemented carbide obtained by the conventional method for manufacturing a cemented carbide, the first element is randomly disposed in an interface region between WC particles and a binder phase, and the maximum peak M of each of the first element is not present between the peak W1 and the peak W2 in the first graph.

Embodiment 2: Cutting Tool

The cutting tool of the present embodiment includes a cutting edge formed from the cemented carbide of Embodiment 1. In the present disclosure, the term cutting edge means a portion involved in cutting. More specifically, the term cutting edge means a region surrounded by a cutting edge ridgeline and a virtual plane having a distance of 0.5 nm or 2 mm from the cutting edge ridgeline to the cemented carbide side.

Figure 3:
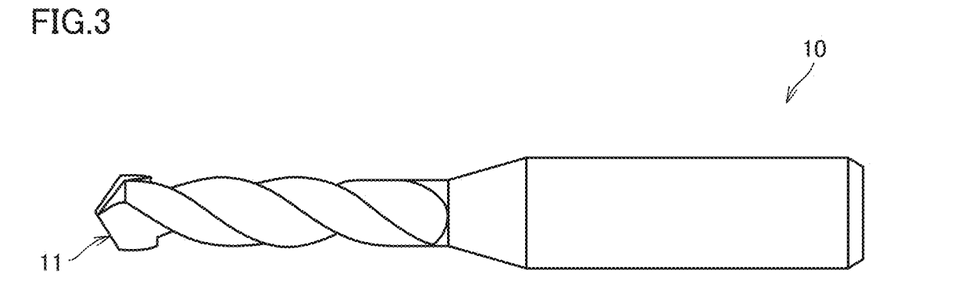
FIG. 3 is a schematic view of a cutting tool according to Embodiment 2.

Examples of the cutting tool include a cutting bit, a drill, an end mill, an indexable cutting insert for milling working, an indexable cutting insert for turning working, a metal saw, a gear cutting tool, a reamer, and a tap. In particular, as shown in FIG. 3, a cutting tool 10 of the present embodiment can exhibit an excellent effect in the case of a small-diameter drill for working a printed circuit board. A cutting edge 11 of cutting tool 10 shown in FIG. 3 is formed from the cemented carbide of Embodiment 1.

The cemented carbide of the present embodiment may constitute the whole of each of these tools, or a part thereof. Here, the term "constituting a part" refers to, for example, a mode of forming a cutting edge portion by brazing the cemented carbide of the present embodiment at a predetermined position of an arbitrary base material.

The cutting tool of the present embodiment may further include a hard film that coats at least a part of the surface of the base material formed from the cemented carbide. For example, diamond-like carbon or diamond can be used as the hard film.

The cutting tool of the present embodiment can be obtained by compacting the cemented carbide of Embodiment 1 into a desired shape.

EXAMPLES

The present embodiment will be described more specifically with reference to Examples. However, the present embodiment is not limited by these Examples.

[Making Cemented Carbide]

A cemented carbide of each sample was made by the following procedure.

A WC powder (average particle diameter of 0.5 µm), a Co powder (average particle diameter of 1.0 µm), a TiCN powder (average particle diameter of 0.1 µm), a TaC powder (average particle diameter of 0.3 µm), a NbC powder (average particle diameter of 0.3 µm), a ZrC powder (average particle diameter of 0.5 µm), a $CeC_2$ powder (average particle diameter of 0.5 µm), a $Y_2O_3$ powder (average particle diameter of 0.5 µm), and a B4C powder (average particle diameter of 0.5 µm) were prepared in the proportions shown in the "Raw material powders" column of Table 1 to Table 3.

TABLE 1

| | Raw material powders | | | | | | | | |
|---|---|---|---|---|---|---|---|---|---|
| Sample No. | WC % by mass | Co % by mass | TiCN % by mass | TaC % by mass | NbC % by mass | ZrC % by mass | $CeC_2$ % by mass | $Y_2O_3$ % by mass | $B_4C$ % by mass |
| 1 | 92.100 | 3.200 | 4.700 | — | — | — | — | — | — |
| 2 | 84.800 | 13.100 | 2.100 | — | — | — | — | — | — |
| 3 | 90.194 | 9.800 | 0.006 | — | — | — | — | — | — |
| 4 | 90.000 | 5.100 | 4.900 | — | — | — | — | — | — |
| 5 | 99.930 | 0.040 | 0.030 | — | — | — | — | — | — |
| 6 | 86.700 | 5.200 | 8.100 | — | — | — | — | — | — |
| 7 | 84.100 | 6.100 | — | 9.800 | — | — | — | — | — |
| 8 | 76.600 | 10.300 | — | 13.100 | — | — | — | — | — |
| 9 | 89.085 | 10.900 | — | 0.015 | — | — | — | — | — |
| 10 | 96.500 | 2.400 | — | 1.100 | — | — | — | — | — |
| 11 | 99.860 | 0.040 | — | 0.100 | — | — | — | — | — |
| 12 | 72.900 | 5.400 | — | 21.700 | — | — | — | — | — |
| 13 | 96.100 | 3.000 | — | — | 0.900 | — | — | — | — |
| 14 | 86.500 | 11.800 | — | — | 1.700 | — | — | — | — |
| 15 | 98.893 | 1.100 | — | — | 0.007 | — | — | — | — |
| 16 | 85.800 | 6.300 | — | — | 7.900 | — | — | — | — |
| 17 | 88.140 | 0.060 | — | — | 11.800 | — | — | — | — |
| 18 | 86.000 | 10.700 | — | — | 3.300 | — | — | — | — |
| 19 | 87.900 | 4.300 | — | — | — | 7.800 | — | — | — |
| 20 | 83.900 | 8.900 | — | — | — | 7.200 | — | — | — |
| 21 | 92.893 | 7.100 | — | — | — | 0.007 | — | — | — |
| 22 | 87.100 | 8.100 | — | — | — | 4.800 | — | — | — |
| 23 | 99.940 | 0.040 | — | — | — | 0.020 | — | — | — |
| 24 | 87.400 | 2.900 | — | — | — | 9.700 | — | — | — |
| 25 | 83.300 | 4.800 | — | — | — | — | 11.900 | — | — |
| 26 | 75.800 | 9.900 | — | — | — | — | 14.300 | — | — |

TABLE 2

| | Raw material powders | | | | | | | | |
|---|---|---|---|---|---|---|---|---|---|
| Sample No. | WC % by mass | Co % by mass | TiCN % by mass | TaC % by mass | NbC % by mass | ZrC % by mass | $CeC_2$ % by mass | $Y_2O_3$ % by mass | $B_4C$ % by mass |
| 27 | 90.580 | 9.400 | — | — | — | — | 0.020 | — | — |
| 28 | 82.000 | 7.900 | — | — | — | — | 10.100 | — | — |

TABLE 2-continued

| Sample No. | WC % by mass | Co % by mass | TiCN % by mass | TaC % by mass | NbC % by mass | ZrC % by mass | $CeC_2$ % by mass | $Y_2O_3$ % by mass | $B_4C$ % by mass |
|---|---|---|---|---|---|---|---|---|---|
| 29 | 99.930 | 0.040 | — | — | — | — | 0.030 | — | — |
| 30 | 85.400 | 9.200 | — | — | — | — | 5.400 | — | — |
| 31 | 86.700 | 5.100 | — | — | — | — | — | 8.200 | — |
| 32 | 81.700 | 10.400 | — | — | — | — | — | 7.900 | — |
| 33 | 90.790 | 9.200 | — | — | — | — | — | 0.010 | — |
| 34 | 86.100 | 5.600 | — | — | — | — | — | 8.300 | — |
| 35 | 99.930 | 0.040 | — | — | — | — | — | 0.030 | — |
| 36 | 88.720 | 10.800 | — | — | — | — | — | 0.480 | — |
| 37 | 94.500 | 0.700 | — | — | — | — | — | — | 4.800 |
| 38 | 91.700 | 5.100 | — | — | — | — | — | — | 3.200 |
| 39 | 88.850 | 11.100 | — | — | — | — | — | — | 0.050 |
| 40 | 85.000 | 10.100 | — | — | — | — | — | — | 4.900 |
| 41 | 99.360 | 0.040 | — | — | — | — | — | — | 0.600 |
| 42 | 85.600 | 11.900 | — | — | — | — | — | — | 2.500 |
| 43 | 94.600 | 2.200 | 1.500 | — | 1.700 | — | — | — | — |
| 44 | 83.900 | 8.100 | 5.900 | 2.100 | — | — | — | — | — |
| 45 | 91.990 | 8.000 | 0.007 | — | — | 0.003 | — | — | — |
| 46 | 86.800 | 10.000 | 1.100 | — | — | — | — | — | 2.100 |
| 47 | 87.400 | 12.100 | 0.290 | — | — | — | 0.210 | — | — |
| 48 | 90.200 | 6.000 | 1.700 | — | — | — | — | 2.100 | — |
| 49 | 60.800 | 37.700 | 1.500 | — | — | — | — | — | — |
| 50 | 87.599 | 12.400 | 0.001 | — | — | — | — | — | — |
| 51 | 93.000 | 6.100 | 0.900 | — | — | — | — | — | — |
| 52 | 53.900 | 11.400 | 34.700 | — | — | — | — | — | — |

TABLE 3

| Sample No. | WC % by mass | Co % by mass | TiCN % by mass | TaC % by mass | NbC % by mass | ZrC % by mass | $CeC_2$ % by mass | $Y_2O_3$ % by mass | $B_4C$ % by mass |
|---|---|---|---|---|---|---|---|---|---|
| 53 | 60.700 | 37.500 | — | 1.800 | — | — | — | — | — |
| 54 | 87.599 | 12.400 | — | 0.001 | — | — | — | — | — |
| 55 | 92.300 | 6.100 | — | 1.600 | — | — | — | — | — |
| 56 | 62.100 | 8.100 | — | 29.800 | — | — | — | — | — |
| 57 | 63.700 | 34.700 | — | — | 1.600 | — | — | — | — |
| 58 | 87.599 | 12.400 | — | — | 0.001 | — | — | — | — |
| 59 | 92.600 | 6.300 | — | — | 1.100 | — | — | — | — |
| 60 | 53.900 | 11.400 | — | — | 34.700 | — | — | — | — |
| 61 | 63.700 | 34.900 | — | — | — | 1.400 | — | — | — |
| 62 | 87.599 | 12.400 | — | — | — | 0.001 | — | — | — |
| 63 | 92.800 | 6.100 | — | — | — | 1.100 | — | — | — |
| 64 | 57.800 | 12.200 | — | — | — | 30.000 | — | — | — |
| 65 | 63.500 | 35.100 | — | — | — | — | 1.400 | — | — |
| 66 | 87.599 | 12.400 | — | — | — | — | 0.001 | — | — |
| 67 | 92.800 | 6.100 | — | — | — | — | 1.100 | — | — |
| 68 | 61.800 | 8.200 | — | — | — | — | 30.000 | — | — |
| 69 | 63.600 | 35.000 | — | — | — | — | — | 1.400 | — |
| 70 | 87.599 | 12.400 | — | — | — | — | — | 0.001 | — |
| 71 | 92.800 | 6.100 | — | — | — | — | — | 1.100 | — |
| 72 | 61.900 | 8.100 | — | — | — | — | — | 30.000 | — |
| 73 | 64.520 | 35.000 | — | — | — | — | — | — | 0.480 |
| 74 | 87.599 | 12.400 | — | — | — | — | — | — | 0.001 |
| 75 | 93.010 | 6.200 | — | — | — | — | — | — | 0.790 |
| 76 | 67.900 | 12.100 | — | — | — | — | — | — | 20.000 |

The raw material powders were mixed by a bead mill to obtain mixed powders. The mixing conditions (medium diameter, rotation speed, loading rate, and time) are as follows. The "loading rate" means the bead loading rate.

<<Sample 1 to Sample 48>>

Medium diameter of 6 mm, rotation speed of 200 rpm, loading rate of 40%, mixing time of 20 hours.

<<Sample 49 to Sample 76>>

Medium diameter of 6 mm, rotation speed of 100 rpm, loading rate of 40%, mixing time of 10 hours.

Next, the mixed powders were each pressed to fabricate a cutting insert-shaped compact. Next, the compact was sintered to obtain a cemented carbide intermediate. The sintering conditions for each sample are as follows.

<<Sample 1 to sample 48>>

First sintering step: Holding in Ar gas at a pressure of 5 MPa and a temperature of 1450° C. for 400 minutes.

Second sintering step: Holding in Ar gas at a pressure of 5 MPa and a temperature of 1350° C. for 300 minutes.

<<Sample 49 to Sample 76>>

First sintering step: Holding in Ar gas at a pressure of 0.1 MPa and a temperature of 1450° C. for 60 minutes.

Second sintering step: No.

The "first sintering step" is a sintering step carried out immediately after the start of sintering. The "second sintering step" is a second-stage sintering step carried out after the first sintering step. The description of "No" for the second sintering step indicates that the second sintering step was not carried out. Next, the cemented carbide intermediate was rapidly cooled in Ar gas under a condition of a pressure of 200 MPaG. The cooled cemented carbide intermediates were subjected to HIP treatment by using a hot isostatic pressing (HIP) apparatus to obtain a cemented carbide of each sample. The HIP treatment conditions are as follows.

<<Sample 1 to Sample 48>>

A pressure of 100 MPa was applied for 120 minutes.

<<Sample 49 to Sample 76>>

A pressure of 10 MPa was applied for 60 minutes.

[Fabrication of Cutting Tool]

The obtained cemented carbide was worked to fabricate an indexable cutting tool (shape: end mill).

[Evaluation of Cemented Carbide]

<Content (% by Volume) of Tungsten Carbide Particles in Cemented Carbide and Content (% by volume) of Binder Phase>

The content (% by volume) of the tungsten carbide particles in the cemented carbide and the content (% by volume) of the binder phase of each sample were measured. A specific measuring method is as described in Embodiment 1. Results thereof are shown in the "WC particle content" and "Binder phase content" columns of "Cemented carbide" of Table 4 to Table 6. Further, the sum of the content of the tungsten carbide particles and the content of the binder phase in the cemented carbide is shown in the "WC particle+binder phase content" column of "Cemented carbide" of Table 4 to Table 6. It was confirmed that cemented carbides with less than 100% by volume in the "WC particle+binder phase content" column of Table 4 to Table 6 included a precipitate, a solid solution, or the like of a compound including the first element (for example, TiCN or TaC).

<Cobalt Content of Binder Phase>

In the cemented carbide of each sample, the cobalt content of the binder phase was measured. A specific measuring method is as described in Embodiment 1. Results thereof are shown in the "Co content of binder phase" column of "Cemented carbide" of Table 4 to Table 6.

<Total Content of First Element in Cemented Carbide>

In the cemented carbide of each sample, the type and the total content of the first element in the cemented carbide were measured. A specific measuring method is as described in Embodiment 1. Results thereof are shown in the "Type of First element" and "Total content of First element" columns of "Cemented carbide" of Table 7 to Table 9.

<Line Analysis>

The cemented carbide of each sample was subjected to the line analysis shown in Embodiment 1 to obtain a first graph. It was checked whether or not the maximum peak M of each of the first element is present between the peak W1 of tungsten closest to the origin O and a further peak W2 of tungsten closest to the peak W1 in the first graph for each sample. Results thereof are shown in the "Maximum peak M" column of "Cemented carbide" of Table 7 to Table 9. "Yes" indicates that the maximum peak M is present, and "No" indicates that the maximum peak M is not present. When a plurality of maximum peaks M are present, "Yes" is indicated if all the maximum peaks are present between W1 and W2.

In the samples in which the "maximum peak M" is present, the ratio IB/IA of the intensity IB to the maximum peak intensity IA of the maximum peak M was measured. Here, the intensity IB is the normalized intensity of the first element at a distance P2, which is a distance of 0.2 nm from a distance P1 at the maximum peak intensity toward the opposite side of the origin of the first graph. Results thereof are shown in the "IB/IA" column of "Cemented carbide" of Table 7 to Table 9.

TABLE 4

| | Cemented carbide | | | |
|---|---|---|---|---|
| Sample No. | WC particle content % by volume | Binder phase content % by volume | WC particle + binder phase content % by volume | Co content in binder phase % by mass |
| 1 | 81.6 | 13.6 | 95.2 | 50.0 |
| 2 | 74.3 | 20.0 | 94.3 | 99.9 |
| 3 | 83.8 | 16.1 | 99.9 | 99.9 |
| 4 | 78.0 | 18.0 | 96.0 | 59.3 |
| 5 | 99.8 | 0.1 | 99.9 | 94.2 |
| 6 | 71.6 | 8.4 | 80.0 | 90.8 |
| 7 | 80.7 | 15.1 | 95.8 | 50.0 |
| 8 | 72.1 | 20.0 | 92.1 | 73.9 |
| 9 | 81.9 | 18.0 | 99.9 | 99.9 |
| 10 | 94.8 | 5.0 | 99.8 | 75.3 |
| 11 | 99.8 | 0.1 | 99.9 | 79.3 |
| 12 | 72.8 | 7.2 | 80.0 | 96.1 |
| 13 | 80.1 | 11.0 | 91.1 | 50.0 |
| 14 | 78.6 | 20.0 | 98.6 | 95.8 |
| 15 | 98.2 | 1.8 | 99.9 | 99.7 |
| 16 | 65.2 | 14.9 | 80.1 | 67.3 |
| 17 | 79.9 | 0.1 | 80.0 | 87.8 |
| 18 | 77.1 | 18.0 | 95.1 | 96.7 |
| 19 | 77.0 | 15.0 | 92.0 | 50.0 |
| 20 | 71.1 | 20.0 | 91.1 | 73.2 |
| 21 | 87.7 | 12.2 | 99.9 | 99.8 |
| 22 | 76.8 | 18.0 | 94.8 | 75.1 |
| 23 | 99.8 | 0.1 | 99.9 | 89.9 |
| 24 | 74.5 | 5.5 | 80.0 | 87.1 |
| 25 | 69.1 | 16.0 | 85.1 | 50.0 |
| 26 | 60.0 | 20.0 | 80.0 | 74.9 |

TABLE 5

| | Cemented carbide | | | |
|---|---|---|---|---|
| Sample No. | WC particle content % by volume | Binder phase content % by volume | WC particle + binder phase content % by volume | Co content in binder phase % by mass |
| 27 | 84.2 | 15.7 | 99.9 | 99.8 |
| 28 | 68.8 | 12.0 | 80.8 | 56.1 |
| 29 | 99.2 | 0.1 | 99.3 | 90.1 |
| 30 | 73.7 | 18.0 | 91.7 | 83.1 |
| 31 | 72.8 | 20.0 | 92.8 | 50.0 |
| 32 | 65.0 | 15.0 | 80.0 | 99.2 |
| 33 | 85.1 | 14.8 | 99.9 | 99.9 |
| 34 | 70.9 | 10.0 | 80.9 | 87.4 |
| 35 | 9.9 | 0.1 | 10.0 | 92.5 |
| 36 | 80.6 | 18.0 | 98.6 | 98.8 |
| 37 | 82.3 | 3.0 | 85.3 | 50.0 |
| 38 | 70.0 | 10.0 | 80.0 | 90.8 |
| 39 | 80.2 | 18.0 | 98.2 | 99.6 |
| 40 | 67.1 | 15.0 | 82.1 | 97.0 |
| 41 | 95.3 | 0.1 | 95.4 | 98.2 |
| 42 | 72.5 | 20.0 | 92.5 | 97.1 |
| 43 | 87.1 | 9.0 | 96.1 | 50.0 |
| 44 | 68.0 | 12.0 | 80.0 | 97.2 |
| 45 | 86.6 | 13.0 | 99.6 | 99.9 |

TABLE 5-continued

| | Cemented carbide | | | |
|---|---|---|---|---|
| Sample No. | WC particle content % by volume | Binder phase content % by volume | WC particle + binder phase content % by volume | Co content in binder phase % by mass |
| 46 | 75.4 | 18.0 | 93.4 | 90.6 |
| 47 | 79.4 | 20.0 | 99.4 | 97.7 |
| 48 | 78.2 | 13.0 | 91.2 | 82.3 |
| 49 | 46.2 | 50.0 | 96.2 | 99.9 |
| 50 | 77.8 | 20.0 | 97.8 | 99.9 |
| 51 | 86.5 | 12.0 | 98.5 | 91.4 |
| 52 | 27.2 | 15.0 | 42.2 | 81.5 |

TABLE 6

| | Cemented carbide | | | |
|---|---|---|---|---|
| Sample No. | WC particle content % by volume | Binder phase content % by volume | WC particle + binder phase content % by volume | Co content in binder phase % by mass |
| 53 | 45.4 | 50.0 | 95.4 | 98.2 |
| 54 | 76.6 | 20.0 | 96.6 | 99.9 |
| 55 | 88.1 | 10.0 | 98.1 | 98.0 |
| 56 | 59.6 | 15.0 | 74.6 | 82.5 |
| 57 | 49.3 | 50.0 | 99.3 | 95.3 |
| 58 | 79.7 | 20.0 | 99.7 | 99.9 |
| 59 | 88.1 | 10.0 | 98.1 | 97.9 |
| 60 | 39.3 | 15.0 | 54.3 | 97.3 |
| 61 | 49.4 | 50.0 | 99.4 | 96.8 |
| 62 | 79.9 | 20.0 | 99.9 | 99.9 |
| 63 | 87.3 | 10.0 | 97.3 | 99.8 |
| 64 | 39.1 | 15.0 | 54.1 | 96.1 |
| 65 | 49.3 | 50.0 | 99.3 | 96.5 |
| 66 | 78.3 | 20.0 | 98.3 | 99.5 |
| 67 | 87.0 | 10.0 | 97.0 | 98.9 |
| 68 | 42.7 | 10.0 | 52.7 | 97.5 |
| 69 | 49.1 | 50.0 | 99.1 | 97.1 |
| 70 | 79.3 | 20.0 | 99.3 | 99.7 |
| 71 | 86.2 | 10.0 | 96.2 | 99.6 |
| 72 | 36.6 | 10.0 | 46.6 | 89.6 |
| 73 | 49.8 | 50.0 | 99.8 | 98.8 |
| 74 | 79.9 | 20.0 | 99.9 | 99.7 |
| 75 | 85.2 | 10.0 | 95.2 | 99.4 |
| 76 | 30.8 | 10.0 | 40.8 | 98.7 |

TABLE 7

| | Cemented carbide | | | | Cutting test |
|---|---|---|---|---|---|
| | First element | | Maximum | | Cutting |
| Sample No. | Type | Total content Atomic % | peak M Yes/No | IB/IA | distance m |
| 1 | Ti | 12.000 | Yes | 0.80 | 3.70 |
| 2 | Ti | 3.300 | Yes | 0.61 | 1.60 |
| 3 | Ti | 0.010 | Yes | 0.51 | 2.50 |
| 4 | Ti | 10.000 | Yes | 0.74 | 3.20 |
| 5 | Ti | 0.080 | Yes | 0.59 | 1.90 |
| 6 | Ti | 17.200 | Yes | 0.87 | 2.30 |
| 7 | Ta | 8.300 | Yes | 0.72 | 4.30 |
| 8 | Ta | 10.500 | Yes | 0.77 | 1.40 |
| 9 | Ta | 0.010 | Yes | 0.51 | 1.90 |
| 10 | Ta | 1.000 | Yes | 0.61 | 2.30 |
| 11 | Ta | 0.080 | Yes | 0.54 | 2.10 |
| 12 | Ta | 20.000 | Yes | 0.91 | 3.40 |
| 13 | Nb | 1.120 | Yes | 0.61 | 2.00 |
| 14 | Nb | 1.780 | Yes | 0.65 | 1.60 |
| 15 | Nb | 0.010 | Yes | 0.51 | 1.80 |
| 16 | Nb | 10.100 | Yes | 0.80 | 4.70 |
| 17 | Nb | 20.000 | Yes | 0.92 | 2.10 |

TABLE 7-continued

| | Cemented carbide | | | | Cutting test |
|---|---|---|---|---|---|
| | First element | | Maximum | | Cutting |
| Sample No. | Type | Total content Atomic % | peak M Yes/No | IB/IA | distance m |
| 18 | Nb | 4.300 | Yes | 0.72 | 2.90 |
| 19 | Zr | 9.800 | Yes | 0.78 | 2.50 |
| 20 | Zr | 9.400 | Yes | 0.75 | 1.20 |
| 21 | Zr | 0.010 | Yes | 0.51 | 2.70 |
| 22 | Zr | 7.200 | Yes | 0.74 | 3.20 |
| 23 | Zr | 0.030 | Yes | 0.52 | 1.90 |
| 24 | Zr | 14.200 | Yes | 0.82 | 1.80 |
| 25 | Ce | 7.100 | Yes | 0.66 | 3.00 |
| 26 | Ce | 7.500 | Yes | 0.68 | 1.60 |

TABLE 8

| | Cemented carbide | | | | Cutting test |
|---|---|---|---|---|---|
| | First element | | Maximum | | Cutting |
| Sample No. | Type | Total content Atomic % | peak M Yes/No | IB/IA | distance m |
| 27 | Ce | 0.010 | Yes | 0.51 | 2.30 |
| 28 | Ce | 9.800 | Yes | 0.71 | 3.40 |
| 29 | Ce | 0.020 | Yes | 0.51 | 2.00 |
| 30 | Ce | 2.900 | Yes | 0.58 | 2.20 |
| 31 | Y | 9.900 | Yes | 0.78 | 1.20 |
| 32 | Y | 8.900 | Yes | 0.75 | 3.00 |
| 33 | Y | 0.010 | Yes | 0.51 | 2.70 |
| 34 | Y | 10.000 | Yes | 0.81 | 1.90 |
| 35 | Y | 0.040 | Yes | 0.53 | 1.60 |
| 36 | Y | 0.490 | Yes | 0.59 | 2.10 |
| 37 | B | 8.400 | Yes | 0.78 | 2.50 |
| 38 | B | 4.500 | Yes | 0.65 | 3.70 |
| 39 | B | 0.010 | Yes | 0.51 | 1.90 |
| 40 | B | 9.800 | Yes | 0.81 | 3.20 |
| 41 | B | 0.700 | Yes | 0.57 | 1.50 |
| 42 | B | 2.000 | Yes | 0.62 | 1.40 |
| 43 | Ti, Nb | 5.100 | Yes | 0.71 | 2.10 |
| 44 | Ti, Ta | 14.900 | Yes | 0.79 | 1.90 |
| 45 | Ti, Zr | 0.010 | Yes | 0.51 | 2.70 |
| 46 | Ti, B | 6.300 | Yes | 0.72 | 3.20 |
| 47 | Ti, Ce | 0.390 | Yes | 0.56 | 1.30 |
| 48 | Ti, Y | 10.000 | Yes | 0.74 | 3.40 |
| 49 | Ti | 1.400 | No | — | 0.04 |
| 50 | Ti | 0.001 | No | — | 0.90 |
| 51 | Ti | 1.700 | No | — | 0.80 |
| 52 | Ti | 47.900 | No | — | 0.10 |

TABLE 9

| | Cemented carbide | | | | Cutting test |
|---|---|---|---|---|---|
| | First element | | Maximum | | Cutting |
| Sample No. | Type | Total content Atomic % | peak M Yes/No | IB/IA | distance m |
| 53 | Ta | 1.100 | No | — | 0.10 |
| 54 | Ta | 0.0008 | No | — | 0.80 |
| 55 | Ta | 0.870 | No | — | 0.70 |
| 56 | Ta | 25.300 | No | — | 0.03 |
| 57 | Nb | 1.400 | No | — | 0.04 |
| 58 | Nb | 0.001 | No | — | 0.60 |
| 59 | Nb | 1.600 | No | — | 0.50 |
| 60 | Nb | 36.500 | No | — | 0.01 |
| 61 | Zr | 1.300 | No | — | 0.07 |
| 62 | Zr | 0.001 | No | — | 0.90 |
| 63 | Zr | 1.600 | No | — | 0.50 |
| 64 | Zr | 32.300 | No | — | 0.05 |
| 65 | Ce | 0.920 | No | — | 0.06 |

TABLE 9-continued

| | Cemented carbide | | | | Cutting test |
|---|---|---|---|---|---|
| | First element | | Maximum | | Cutting |
| Sample No. | Type | Total content Atomic % | peak M Yes/No | IB/IA | distance m |
| 66 | Ce | 0.0008 | No | — | 0.70 |
| 67 | Ce | 0.800 | No | — | 0.70 |
| 68 | Ce | 24.400 | No | — | 0.05 |
| 69 | Y | 1.000 | No | — | 0.10 |
| 70 | Y | 0.001 | No | — | 0.70 |
| 71 | Y | 1.500 | No | — | 0.60 |
| 72 | Y | 35.600 | No | — | 0.01 |
| 73 | B | 0.420 | No | — | 0.02 |
| 74 | B | 0.008 | No | — | 0.90 |
| 75 | B | 1.200 | No | — | 0.50 |
| 76 | B | 28.400 | No | — | 0.01 |

<Cutting Test>

End milling working was carried out by using the cutting tool of each sample under the following conditions, and the wear loss of the flank face was measured every 0.01 m of cutting distance. The tool life is the cutting distance when the wear loss reaches 0.1 mm. Results thereof are shown in the "Cutting test" column of Table 7 to Table 9. A longer cutting distance indicates a longer tool life.

<<Cutting Conditions>>

Work material: SKD11
Working: Side working
Cutting speed: 60 m/min
Feed per tooth fz: 0.1 mm/t
Axial depth of cut ap: 0.2 mm
Radial depth of cut ae: 0.1 mm
Cutting fluid: Water-soluble cutting oil The above cutting conditions correspond to cutting work of a high-hardness material.

<Discussion>

The cemented carbides and cutting tools of sample 1 to sample 48 correspond to Examples. The cemented carbides and cutting tools of sample 49 to sample 76 correspond to Comparative Examples. It was confirmed that the cutting tools of sample 1 to sample 48 (Examples) exhibited a longer tool life in cutting work of a high-hardness material than the cutting tools of sample 49 to sample 76 (Comparative Examples). It is presumed that this is because the cemented carbides of sample 1 to sample 48 (Examples) had a peak M and a ratio IB/IA of more than 0.5, and thus the wear resistance was improved.

The embodiments and the Examples of the present disclosure have been described as above, and it is also planned from the beginning to appropriately combine the configurations of the embodiments and the Examples described above and to modify these in various ways.

The embodiments and the Examples disclosed this time should be considered to be illustrative in all respects and non-limiting. The scope of the present invention is defined by the Claims, not by the above embodiments and Examples, and is intended to include all modifications within the meaning and scope equivalent to the Claims.

REFERENCE SIGNS LIST

1 tungsten carbide particle, 2 binder phase, 3 cemented carbide, 10 cutting tool, 11 cutting edge

The invention claimed is:

1. A cemented carbide comprising a plurality of tungsten carbide particles and a binder phase, wherein
   the cemented carbide comprises a total of 80% by volume or more of the tungsten carbide particles and the binder phase,
   the cemented carbide comprises 0.1% by volume or more and 20% by volume or less of the binder phase,
   the cemented carbide comprises at least one first element selected from the group consisting of titanium, niobium, zirconium, cerium, and yttrium,
   the cemented carbide comprises a total of 0.01 atomic % or more and 20 atomic % or less of the first element, and
   the binder phase comprises 50% by mass or more of cobalt, and wherein
   in a first graph showing results obtained by carrying out line analysis by using an energy dispersive X-ray spectrometer attached to a transmission electron microscope along a first direction going from the binder phase to the tungsten carbide particles adjacent to each other, in a coordinate system where an X axis is a distance from a position at which cobalt exhibits a maximum intensity, and a Y axis is a normalized intensity,
   a maximum peak M of each of the first element is present between a peak WI of tungsten closest to an origin and a further peak W2 of tungsten closest to the peak W1,
   a ratio IB/IA of an intensity IB to a maximum peak intensity IA of the maximum peak M is more than 0.5 in each of the first element, and
   the intensity IB is an intensity of the first element at a distance P2, which is a distance of 0.2 nm from a distance PI at the maximum peak intensity IA toward an opposite side of the origin.

2. The cemented carbide according to claim 1, wherein the cemented carbide comprises 18% by volume or less of the binder phase.

3. A cutting tool comprising a cutting edge formed from the cemented carbide according to claim 1.

4. The cemented carbide according to claim 1, wherein a maximum concentration region of the first element is present in a surface layer portion of the tungsten carbide particles.

5. The cemented carbide according to claim 1, wherein the cemented carbide comprises 1% by volume or more and 18% by volume or less of the binder phase.

6. The cemented carbide according to claim 1, wherein the cemented carbide comprises a total of 0.5 atomic % or more and 15.0 atomic % or less of the first element.

7. The cemented carbide according to claim 1, wherein the ratio IB/IA of an intensity IB to a maximum peak intensity IA of the maximum peak M is more than 0.60 in each of the first element.

8. The cemented carbide according to claim 1, wherein the ratio IB/IA of an intensity IB to a maximum peak intensity IA of the maximum peak M is more than 0.70 in each of the first element.

9. The cemented carbide according to claim 1, wherein the ratio IB/IA of an intensity IB to a maximum peak intensity IA of the maximum peak M is less than 0.95 in each of the first element.

10. The cemented carbide according to claim 1, wherein the ratio IB/IA of an intensity IB to a maximum peak intensity IA of the maximum peak M is less than 0.8 in each of the first element.

* * * * *